(12) United States Patent
Hedman

(10) Patent No.: US 11,035,457 B2
(45) Date of Patent: Jun. 15, 2021

(54) BEARING ARRANGEMENT AND AN ASSEMBLY COMPRISING SUCH BEARING ARRANGEMENT

(71) Applicant: VOLVO TRUCK CORPORATION, Gothenburg (SE)

(72) Inventor: Anders Hedman, Marstrand (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 123 days.

(21) Appl. No.: 16/483,527

(22) PCT Filed: Feb. 22, 2017

(86) PCT No.: PCT/EP2017/054040
§ 371 (c)(1),
(2) Date: Aug. 5, 2019

(87) PCT Pub. No.: WO2018/153442
PCT Pub. Date: Aug. 30, 2018

(65) Prior Publication Data
US 2020/0116251 A1    Apr. 16, 2020

(51) Int. Cl.
*F16C 19/28* (2006.01)
*F16C 33/66* (2006.01)
(Continued)

(52) U.S. Cl.
CPC ......... *F16H 57/0471* (2013.01); *F16C 19/28* (2013.01); *F16C 33/581* (2013.01);
(Continued)

(58) Field of Classification Search
CPC ...... F16C 19/28; F16C 19/463; F16C 19/466; F16C 33/581; F16C 33/6677;
(Continued)

(56) References Cited

U.S. PATENT DOCUMENTS 2,029,265 A * 1/1936 Kylen .................... F16C 19/28
384/564
4,400,040 A   8/1983 Toth et al.
(Continued)

FOREIGN PATENT DOCUMENTS

CN         101079562 A      11/2007
CN         101203686 A       6/2008
(Continued)

OTHER PUBLICATIONS

Office Action dated Mar. 30, 2020 iin corresponding CN Application No. 201780086656.1, 18 pages.
(Continued)

*Primary Examiner* — Phillip A Johnson
(74) *Attorney, Agent, or Firm* — Venable LLP; Jeffri A. Kaminski

(57) ABSTRACT

The present invention relates to a bearing arrangement (104) connectable to a shaft (102), the bearing arrangement comprising a bearing (105, 105') comprising a plurality of rolling elements (110) arranged to rotate relative to an inner raceway (302) for said bearing arrangement; and a ring shaped contact element (114, 114') having an extension in an axial direction thereof, the ring shaped contact element further comprising a first contact surface (402) adapted to face the plurality of rolling elements, wherein an inner diameter of the ring shaped contact element at the axial position of the first contact surface has a larger diameter in comparison to a diameter (412) of the inner raceway, such that a continuous radial gap (414) is provided in the circumferential direction between the ring shaped contact element and the inner raceway when the bearing arrangement is connected to the shaft, wherein the radial gap (414) is arranged to be provided in fluid communication with a lubricating flow channel (306) of the shaft when the bearing arrangement.

15 Claims, 5 Drawing Sheets

(51) Int. Cl.
*F16H 57/04* (2010.01)
*F16C 33/58* (2006.01)
*F16H 57/021* (2012.01)
*F16H 57/022* (2012.01)

(52) U.S. Cl.
CPC ........ *F16H 57/021* (2013.01); *F16C 2326/06* (2013.01); *F16C 2361/61* (2013.01); *F16H 2057/0228* (2013.01)

(58) Field of Classification Search
CPC .............. F16C 2326/06; F16C 2361/61; F16H 57/021; F16H 57/0471; F16H 2057/0228
See application file for complete search history.

(56) References Cited

U.S. PATENT DOCUMENTS 8,425,361 B1 * 4/2013 Beckner .............. F16H 57/0479
475/159
2006/0252596 A1 * 11/2006 Abarquez ............. F16H 57/082
475/331
2007/0273228 A1 11/2007 Tanaka et al.
2014/0080658 A1 * 3/2014 Edelmann ............... F16H 57/08
475/331

FOREIGN PATENT DOCUMENTS

| CN | 202673973 U | | 1/2013 | |
|---|---|---|---|---|
| CN | 105992882 A | | 10/2016 | |
| DE | 520609 C | * | 3/1931 | ........... B64C 35/001 |
| DE | 102012219321 A1 | * | 4/2014 | ......... F16C 33/6677 |
| JP | 6196219 S | | 5/1986 | |
| JP | 2012107694 A | * | 6/2012 | ............. F16C 19/30 |

OTHER PUBLICATIONS

International Search Report and Written Opinion dated Nov. 24, 2017 in International Application No. PCT/EP2017/054040.

* cited by examiner

BEARING ARRANGEMENT AND AN ASSEMBLY COMPRISING SUCH BEARING ARRANGEMENT

TECHNICAL FIELD

The present invention relates to a bearing arrangement. In particular, the invention relates to a bearing arrangement connectable to a shaft which is preferably provided in a transmission arrangement. The invention also relates to an assembly comprising a shaft and a bearing arrangement, a method for connecting the bearing arrangement to the shaft, a transmission arrangement and a vehicle. The invention is applicable on vehicles, in particularly low, medium and heavy duty vehicles commonly referred to as trucks. Although the invention will mainly be described in relation to a truck, it may also be applicable for other type of vehicles comprising a bearing arrangement in need of improved lubrication thereof.

BACKGROUND

In connection to low-, medium and heavy duty vehicles, also commonly referred to as trucks, a transmission arrangement is connected to a prime mover for controlling torque loads from the prime mover to the propelled wheels of the truck. The transmission arrangement comprises a plurality of transmission shafts, wherein a first shaft often comprises at least one gear wheel which is arranged in meshed connection with a gear wheel arranged on a second shaft. A bearing arrangement is often provided between the transmission shaft and the gear wheel in order to controllably connect the gear wheel to the shaft. Hence, when the gear wheel is connected to the shaft, the gear wheel will have no relative rotation to the shaft, and when the gear wheel is disconnected from the shaft, the gear wheel will have a relative rotation to the shaft.

In situations where the gear wheel has no relative rotation to the shaft, while at the same time being exposed to mesh forces, there may be an insufficient lubrication for the bearing arrangement at positions where the bearing is exposed to axial loading. This may be critical for proper functionality and durability of the bearing arrangement.

For tapered roller bearings, lubrication at these positions can be improved by, for example, increasing the cone angle of the rolling elements. However, such a solution is associated with an increased radial space of the bearing arrangement which is most often a critical parameter. For cylindrical roller bearings, the bearings transfer axial forces between end surfaces on the rolling elements and shoulders arranged on an inner and outer bearing ring thereof. Centrifugal forces will distribute lubrication to the contact area between the end surface of the rolling elements and the shoulder arranged on the outer bearing ring. However, the contact area between the end surface of the rolling elements and the shoulder arranged on the inner bearing ring may not be provided with sufficient lubrication.

There is thus a need to improve the lubrication for bearing arrangements, in particularly at interfaces where the rolling element transfer axial loads.

SUMMARY

It is an object of the present invention to provide a bearing arrangement which at least partially overcomes the above described deficiencies. This is achieved by a bearing arrangement according to claim 1.

According to a first aspect of the present invention, there is provided a bearing arrangement connectable to a shaft, the bearing arrangement comprising a bearing comprising a plurality of rolling elements arranged to rotate relative to an inner raceway for the bearing arrangement; and a ring shaped contact element having an extension in an axial direction thereof, the ring shaped contact element further comprising a first contact surface adapted to face the plurality of rolling elements, wherein an inner diameter of the ring shaped contact element at the axial position of the first contact surface has a larger diameter in comparison to a diameter of the inner raceway, such that a continuous radial gap is provided in the circumferential direction between the ring shaped contact element and the inner raceway when the bearing arrangement is connected to the shaft, wherein the radial gap is arranged to be provided in fluid communication with a lubricating flow channel of the shaft when the bearing arrangement is connected to the shaft.

The wording "inner raceway" should in the following and throughout the entire description be interpreted as a surface on which the rolling elements ride. The inner raceway may be provided on an inner bearing ring. However, the inner raceway may more preferably form part of a portion of the shaft. In such a case, the bearing is provided with an inner ring integrated in the shaft. Such bearing with inner ring integrated in the shaft will be described in further detail below. Similarly, the bearing may be provided with an outer ring integrated in e.g. an inner surface of a gear wheel.

Moreover, the ring shaped contact element may have an axial extension which extends from the first contact surface in an axial direction away from the rolling elements as seen in an assembled configuration. The axial extension of the ring shaped contact element may extend to such extent that a circumferential distribution channel can be formed between the shaped contact element and the inner raceway.

Furthermore, the first contact surface of the ring shaped contact element is arranged to be in contact with the at least one of the plurality of rolling elements when the bearing is exposed to axial loading. In case the bearing comprises tapered rolling elements or cylindrical rolling elements, the first contact surface will be arranged in contact with axial end surfaces of at least a part of these rolling elements.

An advantage of the present invention is that improved lubrication to the bearing is provided. In particular, lubrication will be able to reach both the contact surface between the rolling elements and the inner raceway as well as the contact surface between the rolling elements and the first contact surface of the ring shaped contact element. By providing a gap, the circumferential distribution channel will be provided such that the lubrication will be able to flow and provide a continuous lubrication at these positions.

According to an example embodiment, a shaft connecting portion of the ring shaped contact element may be connected to the shaft when the bearing arrangement is connected to the shaft.

Hereby, the ring shaped contact element can transfer axial load from the rolling elements and into the shaft. Also, the ring shaped contact element may be arranged concentric to the shaft and the connection between the shaft connecting portion and the shaft may be such that a relative rotation there between is prevented, especially if the shaft connecting portion is press fitted to the shaft as described below.

According to an example embodiment, the shaft connecting portion of the ring shaped contact element may be intended to be press fitted to the shaft.

As stated above, by press fitting the ring shaped contact element will locate the ring shaped contact element concentric to the shaft and efficiently prevent a relative rotation between the ring shaped contact element and the shaft during operation.

According to an example embodiment, an inner diameter of the shaft connecting portion may be equal to or smaller than the diameter of the inner raceway. This may be particularly suitable when a corresponding connection portion of the shaft has a diameter which is equal to or smaller than the diameter of the raceway.

According to an example embodiment, an inner diameter of the shaft connecting portion may be larger than the diameter of the inner raceway. This may be particularly suitable when a corresponding connection portion of the shaft has a diameter which is larger than the diameter of the raceway.

Accordingly, various inner diameter dimensions for the shaft connection portion are conceivable.

According to an example embodiment, the shaft connecting portion may be arranged at an opposite axial end of the ring shaped contact element in comparison to the first contact surface. Hereby, the ring shaped contact element has an axial extension which will enclose the opening from the flow channel. This will thus further enhance the provision of a circumferential distribution channel where a continuous flow of lubrication can be supplied to the rolling elements.

According to an example embodiment, the rolling elements may be cylindrical roller bearing elements.

A cylindrical roller bearing is advantageous in comparison to a tapered roller bearing as its connection to a shaft can be simplified. In detail, a cylindrical roller bearing is advantageous to use when using an inner ring integrated in the shaft, as described further below. If using e.g. a tapered roller bearing, the shaft surface would need to be tapered. Assembly of the bearing arrangement to the shaft is simplified by using a cylindrical roller bearing as the assembly can be executed from one side of the shaft for all bearings used at the specific position.

According to a second aspect of the present invention, there is provided an assembly comprising a shaft comprising a lubricating flow channel arranged in at least a radial direction within the shaft; and a bearing arrangement connected to the shaft, the bearing arrangement comprising a bearing comprising a plurality of rolling elements arranged to rotate relative to an inner raceway for the bearing arrangement; and a ring shaped contact element having an extension in an axial direction thereof, the ring shaped contact element further comprising a first contact surface facing the plurality of rolling elements, wherein an inner diameter of the ring shaped contact element at the axial position of the first contact surface has a larger diameter in comparison to a diameter of the inner raceway, such that a continuous radial gap is provided in the circumferential direction between the ring shaped contact element and the inner raceway, wherein the radial gap is arranged in fluid communication with the lubricating flow channel of the shaft.

The wording "flow channel arranged in at least a radial direction within the shaft" should be understood to mean that the flow channel has an extension in a direction having a radial component. The extension may also have an axial component as well as a circumferential component. Hence, an inclined flow channel is conceivable and forms part of the scope of the wording.

According to an example embodiment, the ring shaped contact element, the shaft and the bearing may enclose an opening of the lubricating flow channel. Hereby, a well defined volume for the lubrication is provided. Also, the volume provides the circumferential distribution channel described above.

According to an example embodiment, the ring shaped contact element may comprise a second contact surface arranged on an axially opposite side of the ring shaped contact element in comparison to the first contact surface, wherein the second contact surface is abutting a radially protruding portion of the shaft.

The second contact surface may thus efficiently transfer the axial forces from the ring shaped contact element and into the shaft. Also, the radially protruding portion of the shaft could be a component connected to the shaft, i.e. the wording should not be construed as limited to the shaft itself.

According to an example embodiment, the inner raceway may be formed by a portion of a circumferential surface of the shaft.

By providing a bearing with an inner ring integrated in the shaft will reduce cost as less material is needed. Also, the radial dimensions of the bearing arrangement can be reduced; alternatively larger rolling elements can be used. Furthermore, a bearing with an inner ring integrated in the shaft will increase the stiffness of the shaft as the shaft can be made thicker in comparison to the use of separate inner rings for the rolling elements.

Also, when using a bearing with an inner ring integrated in the shaft, self-containing roller and cage assemblies may preferably be used.

Further effects and features of the second aspect are largely analogous to those described above in relation to the first aspect of the present invention.

Accordingly, according to an aspect of the present invention, there is provided an assembly comprising a shaft comprising a lubricating flow channel arranged in at least a radial direction within the shaft; and a bearing arrangement according to any one of the embodiments described above in relation to the first aspect.

According to a third aspect of the present invention, there is provided a ring shaped contact element connectable to a shaft provided with a bearing comprising a plurality of rolling elements arranged to rotate relative to the shaft around an inner raceway, the ring shaped contact element has an extension in an axial direction thereof and comprises a shaft connecting portion arranged to be connected to the shaft, and a first contact surface adapted to face the plurality of rolling elements, wherein an inner diameter of the ring shaped contact element at the axial position of the first contact surface has a diameter which is arranged to be larger in comparison to a diameter of the inner raceway for providing a continuous radial gap in the circumferential direction between the ring shaped contact element and the inner raceway when the ring shaped contact element is connected to the shaft, wherein the ring shaped contact element is arranged to be connected to the shaft in such a way that the radial gap is provided in fluid communication with a lubricating flow channel of the shaft.

Effects and features of the third aspect are largely analogous to those described above in relation to the first and second aspects of the present invention.

According to a fourth aspect of the present invention, there is provided a method for assembling the bearing arrangement described above in relation to the first aspect to a shaft, the method comprising the steps of connecting the bearing to the shaft at a position axially adjacent an opening of a lubricating flow channel of the shaft; and connecting the ring shaped contact element to the shaft such that a portion of the ring shaped contact element is positioned radially above the opening of the lubricating flow channel, and in such a way that a radial gap is provided in the circumferential direction between the ring shaped contact element and the inner raceway.

Hereby, a simple method for assembling the bearing arrangement to the shaft is provided.

According to a fifth aspect of the present invention, there is provided a transmission arrangement for a vehicle, the transmission arrangement comprising a shaft comprising a lubricating flow channel arranged in at least a radial direction within the shaft; and a bearing arrangement according to any one of the example embodiments described above in relation to the first aspect of the present invention.

According to a sixth aspect of the present invention, there is provided a vehicle comprising a transmission arrangement, the transmission arrangement comprising a shaft comprising a lubricating flow channel arranged in at least a radial direction within the shaft; and a bearing arrangement according to any one of the example embodiments described above in relation to the first aspect of the present invention.

It should also be readily understood that effects and features described above in relation to specific aspects of the present invention can be combined with, and are associated with the other aspects of the invention.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
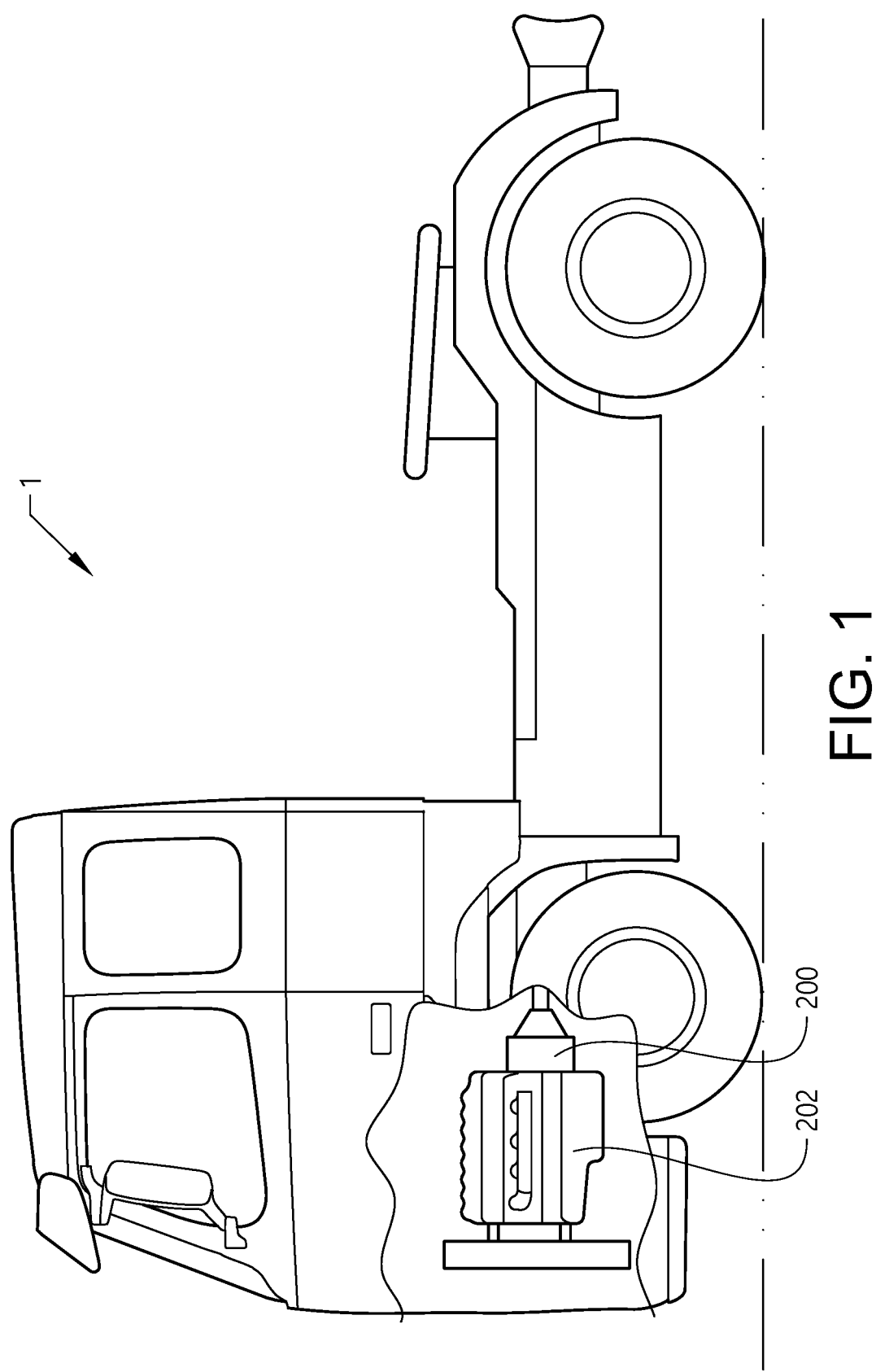
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 with a transmission arrangement 200 and a prime mover 202. The transmission arrangement 200 comprises an assembly 100 (FIG. 2) provided with a shaft 102 and a bearing arrangement 104 according to the present invention. The vehicle 1 depicted in FIG. 1 is a truck for which the inventive assembly 100 and bearing arrangement 104, as will be described further below, is particularly suitable for.

Figure 2:
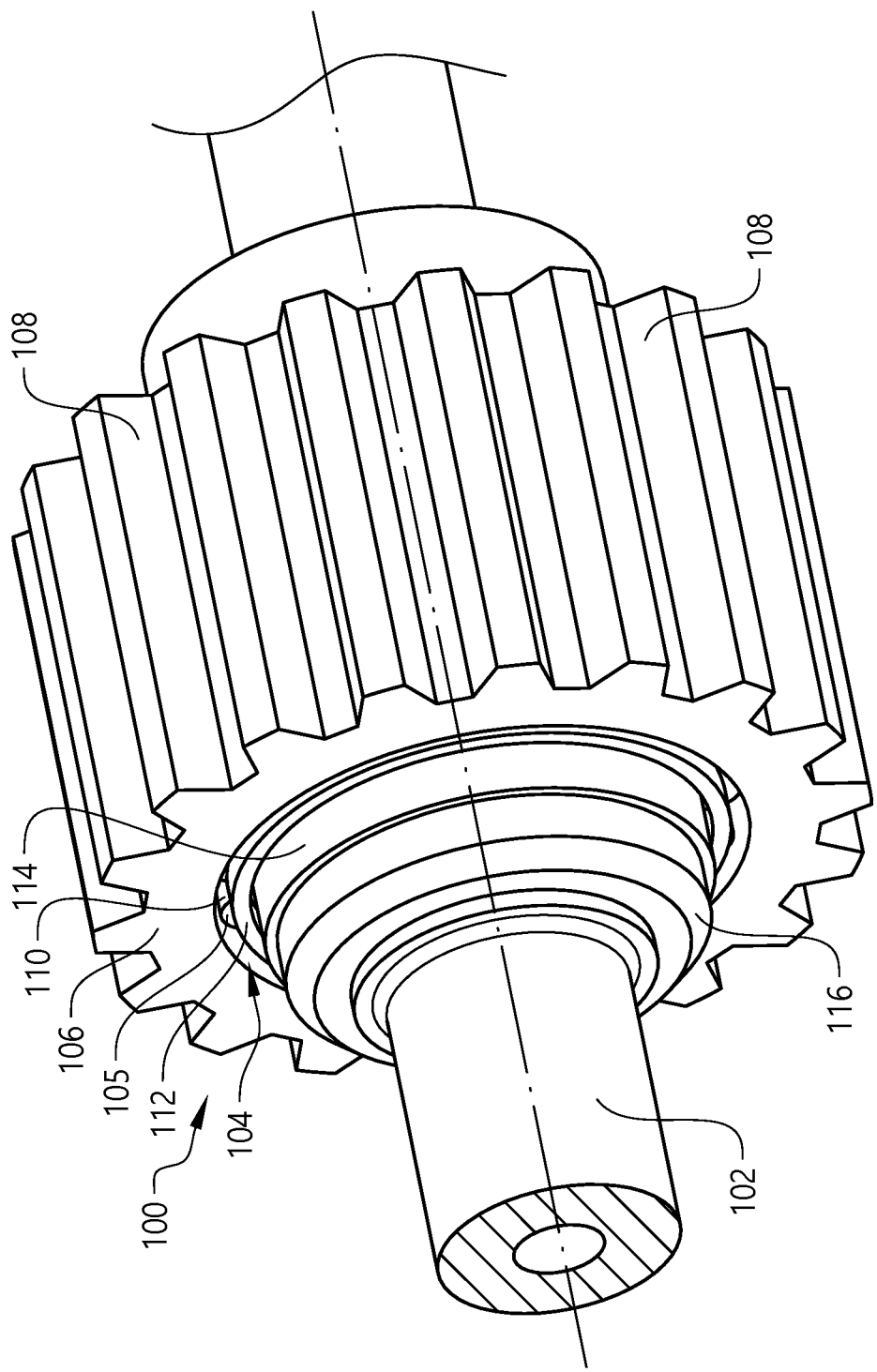
FIG. 2 is a perspective view illustrating an assembly comprising a shaft and a bearing arrangement according to an example embodiment.

Turning to FIG. 2, which is a perspective view illustrating the assembly 100 comprising the shaft 102 and the bearing arrangement 104 according to an example embodiment. The assembly depicted in FIG. 2 further comprises a gear wheel 106. The gear wheel 106 comprises a plurality of gear teeth 108. The gear teeth 108 are in FIG. 2 depicted as straight gear teeth. It should however be readily understood that the gear teeth 108 may be helical such that the gear wheel 106 can sustain axial loads acting thereon. Furthermore, the gear wheel may also comprise clutch teeth (not shown) that are used in connection with an engaging sleeve (not shown) for connecting the gear wheel 106 to the shaft 102, or to other parts of the transmission 200.

As described, the assembly 100 comprises the bearing arrangement 104. The bearing arrangement 104 is thus arranged between the shaft 102 and the gear wheel 106. The bearing arrangement 104 comprises a bearing 105 provided with a plurality of cylindrical roller bearing elements 110 which are preferably arranged on a self-contained roller and cage assembly 112. It should however be readily understood that the present invention is not limited to the use of cylindrical roller bearing elements. Other types of rolling elements are of course conceivable such as e.g. tapered roller bearing elements, etc. However, for simplicity, the rolling elements will in the following be referred to as cylindrical roller bearing elements. As will be described further in relation to the description of FIG. 3, the bearing arrangement 104 preferably comprises a bearing 105 with the inner ring integrated in the shaft 102 and the outer ring integrated in the gear wheel 106.

The bearing arrangement 104 further comprises a ring shaped contact element 114. The ring shaped contact element 114, which will be described in further detail below, is arranged to abut an end surface of the rolling elements 110 when the bearing arrangement 104 is exposed to axial loading from e.g. mesh forces from the gear wheel 106. Moreover, the ring shaped contact element 114 is arranged in axial connection with the protruding portion (403 in FIG. 4) of the shaft 102 or, as depicted in FIG. 2, with a protruding portion of a contact ring 116 which is connected to the shaft 102.

Figure 3:
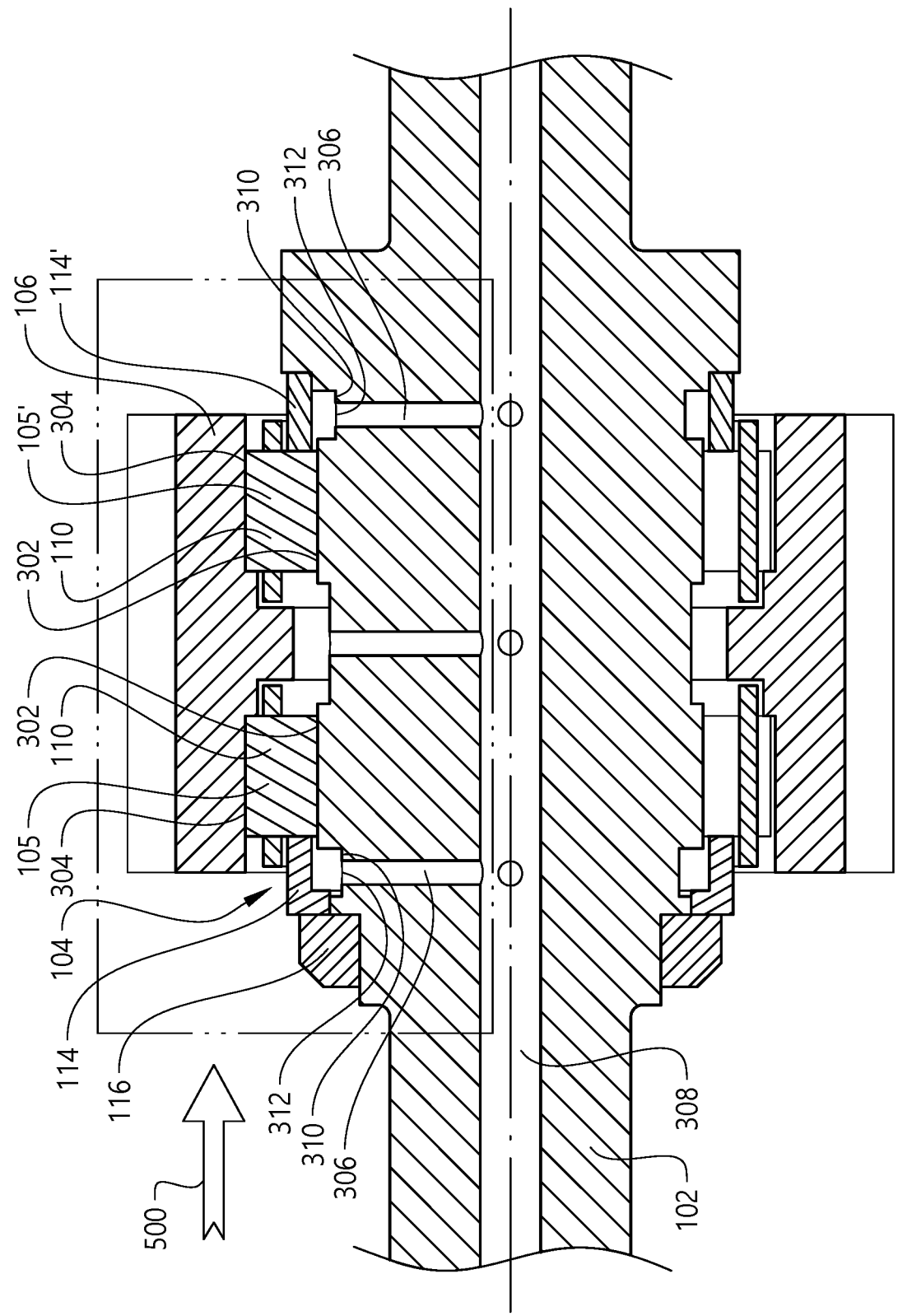
FIG. 3 is a cross-sectional view of an example embodiment of the assembly in FIG. 2.
Figure 4:
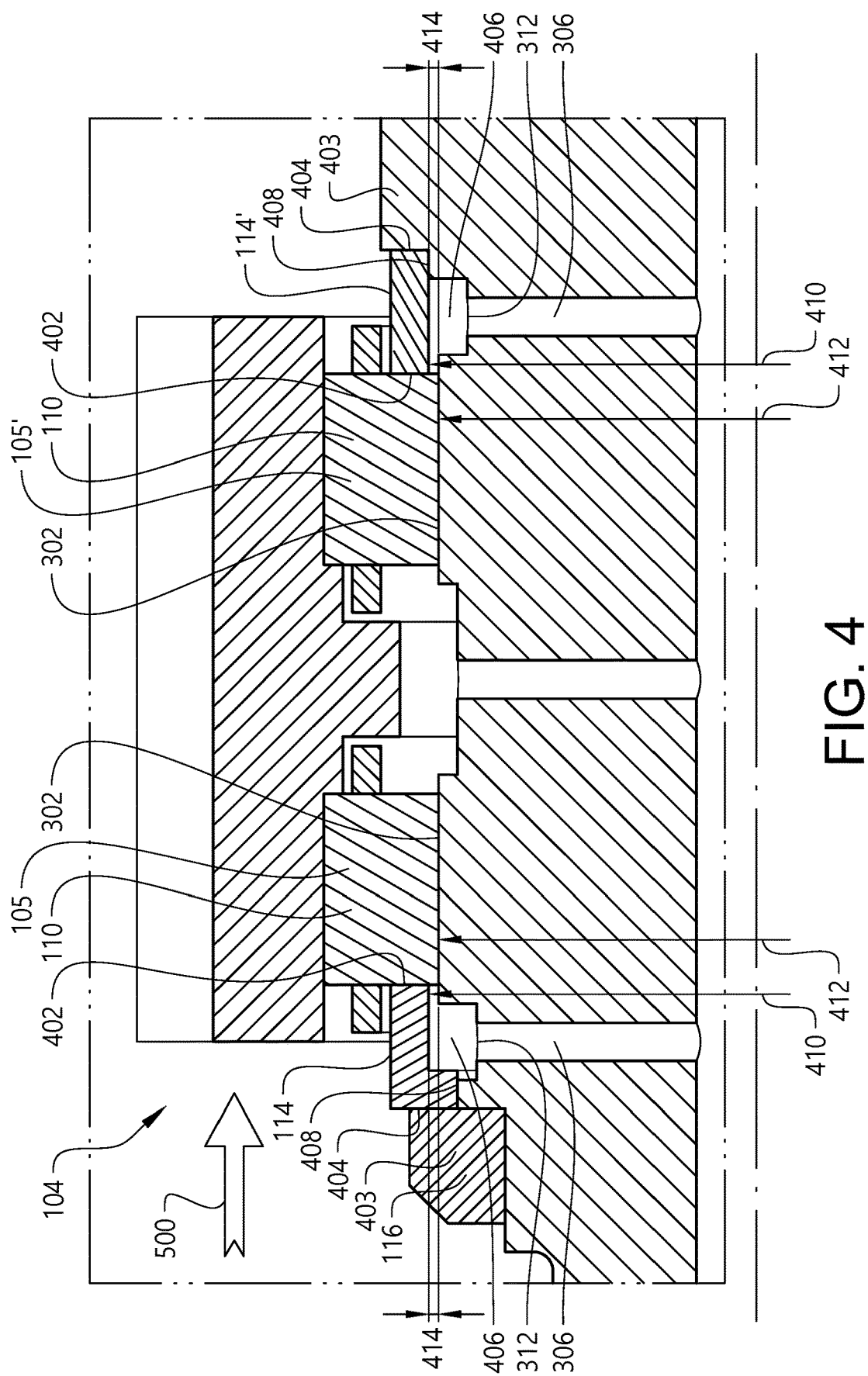
FIG. 4 illustrates a section of the assembly in FIG. 3 in further detail.

In order to describe the invention in further detail reference is therefore made to FIGS. 3 and 4 which are cross-sectional side views illustrating the assembly 100 and the bearing arrangement 104 in further detail. As stated above and as depicted in e.g. FIG. 3, the assembly comprises the shaft 102 at which the bearing arrangement 104 is connected, which bearing arrangement 104 comprising the bearing 105, 105' and the ring shaped contact element 114, 114'. As depicted in FIGS. 3 and 4, the assembly comprises a first 105 and a second bearing 105', wherein the first bearing 105 is arranged at a left hand side and the second bearing 105' is arranged at a right hand side as seen in the figures. Similarly, the assembly comprises a first 114 and a second 114' ring shaped contact element arranged on the respective left and right hand sides. The bearings 105, 105' comprises a plurality of cylindrical roller bearing elements 110 which are arranged to roll against an inner 302 and an outer 304 raceway for the bearing arrangement 104. The inner raceway 302 is constituted by a portion of the circumferential surface of the shaft 102. Hence, according to the example embodiment depicted in FIGS. 3 and 4, the inner ring is integrated in the shaft 102. The outer raceway 304 on the other hand is constituted by a portion of a circumferential inner surface of the gear wheel 106. The outer bearing ring is thus integrated in the gear wheel 106.

The bearing arrangement 104 and the gear wheel 106 are preferably assembled to the shaft 102 from the left hand side towards the right hand side as illustrated by the assembly direction 500. The assembly of the bearing arrangement 104 and the gear wheel 106 will be described in further detail below in relation to the description of FIG. 5.

Furthermore, the shaft 102 comprises a plurality of lubricating flow channels 306. The lubricating flow channels 306 are arranged to supply lubrication to the bearings 105, 105' and extends from a center portion 308 and radially towards a radially outer end surface 310 of the shaft 102. Thus, the lubricating flow channels 306 end in an opening 312 at the radially outer end surface 310 in the vicinity of the bearing arrangement 104. Although not depicted in the figures, the lubricating flow channels may have an extension also in the axial direction thereof such that angled lubricating flow channels are obtained.

Particular reference is now made to FIG. 4 in which the ring shaped contact element is depicted in further detail. Firstly, the first ring shaped contact element 114 will be described. Specifics not described in relation to the first ring shaped contact element 114 will thereafter be described with reference to the second ring shaped contact element 114'.

The ring shaped contact element 114 comprises a first contact surface 402 which is facing the end surfaces of the cylindrical roller bearing elements 110. Thus, when the bearing arrangement 104 is exposed to axial loading, the end surface of at least some of the cylindrical roller bearing elements 110 will abut the first contact surface 402 of the ring shaped contact element 114 for transferring the axial loads to e.g. the shaft 102. The ring shaped contact element 114 thus has an extension in the axial direction from the first contact surface 402 to a second contact surface 404 arranged in abutment with a radially protruding portion 403 of the shaft 102, or as depicted in FIG. 4, a radially protruding portion of a contact ring 116 which is connected to the shaft 102.

The ring shaped contact element 114 further comprises a shaft connecting portion 408. The shaft connecting portion 408 is connected to the shaft 102, preferably by being press fitted to the shaft 102. As can be seen in FIG. 4, the first ring shaped contact element 114 has an L-shaped form, while the second ring shaped contact element 114' has a straight form. The L-shaped form is suitable at positions where the contact area on the shaft 102 is arranged at a diameter which is equal to, or smaller than the diameter 412 of the inner raceway 302. The straight ring shaped contact element 114' is thus suitable to use where the contact area on the shaft 102 is arranged at a diameter which is larger than the diameter 412 of the inner raceway 302. Accordingly, the inner diameter of the shaft connecting portion 408 may be either equal to, or smaller than the diameter 412 of the inner raceway 302, or larger than the diameter 412 of the inner raceway 302, which is thus dependent on the geometries of the shaft 102.

Furthermore, the ring shaped contact element 114 is positioned relative the inner raceway 302 in such a way that a continuous radial gap 414 is formed between the ring shaped contact element 114 and the inner raceway 302. The continuous radial gap 414 is formed by providing larger diameter 410 of the ring shaped contact element 114 at the axial position of the first contact surface 402 in comparison to the diameter 412 of the inner raceway 302.

By means of the axial extension of the ring shaped contact element 114 and the radial gap 414 between the ring shaped contact element 114 and the inner raceway 302, the opening 312 of the lubricating flow channel 306 is enclosed and a circumferential distribution channel 406 is formed. The circumferential distribution channel 406 extends continuously around the circumference of the inner raceway 302 for providing a continuous flow of lubrication to the bearing 105. The circumferential distribution channel 406 is also depicted in FIG. 5.

Figure 5:
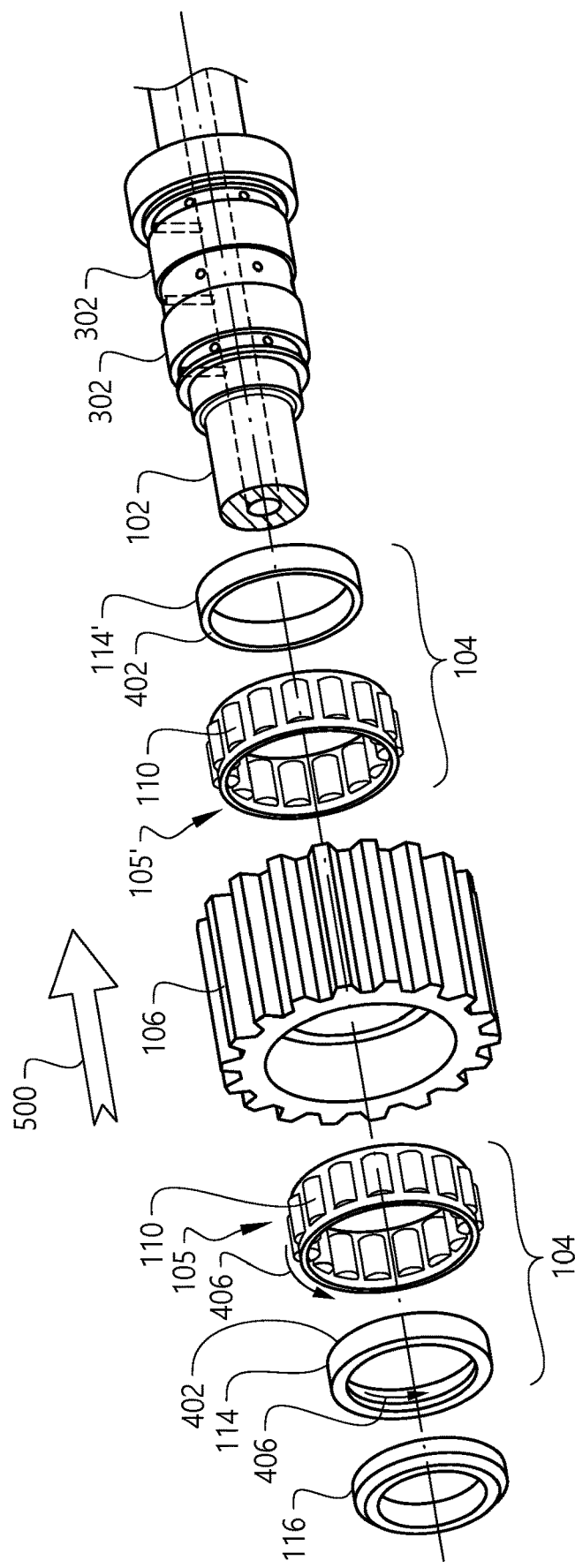
FIG. 5 is an exploded perspective view illustrating an example embodiment for assembling the bearing arrangement to the shaft.

Turning now to FIG. 5 which illustrates an exploded perspective view for assembling the bearing arrangement 104 and the gear wheel 106 to the shaft 102. The bearing arrangement 104 and the gear wheel 106 are assembled from the left to the right as seen by the illustrated assembly direction 500. Firstly, the second ring shaped contact element 114' is connected to the shaft 102 at a position located axially to the right of the right most raceway 302 of the shaft 102 as seen in FIG. 5. More particularly, the shaft connecting portion 408 of the second ring shaped contact element 114' is press fitted to the shaft 102. The diameter of the second ring shaped contact element 114' at the shaft connecting portion 408 is preferably larger than the diameter 412 of the raceway 302, and could be equal to the inner diameter 410 at the first contact surface 402.

Thereafter, the second bearing 105' is connected to the shaft 102 at the right most raceway 302 of the shaft 102. The second bearing 105' is thus arranged to the shaft 102 such that the first contact surface 402 of the second ring shaped contact element 114' is positioned in the vicinity of the end surfaces of the cylindrical roller bearing elements 110. The gear wheel 106 is thereafter connected to the shaft 102 such that the second bearing 105' is enclosed between the shaft 102 and the gear wheel 106. The first bearing 105 is thereafter positioned between the shaft 102 and the gear wheel 106. Hereby, the first bearing 105 is positioned at the left most raceway 302 of the shaft 102. When the first bearing 105 is placed in its position, the first ring shaped contact element 114 is connected to the shaft 102. More particularly, the shaft connecting portion 408 of the first ring shaped contact element 114 is press fitted to the shaft 102. The diameter of the first ring shaped contact element 114 at the shaft connecting portion 408 is preferably equal to, or smaller than the diameter 412 of the raceway 302. The first contact surface 402 of the first ring shaped contact element 114 is positioned in the vicinity of the end surfaces of the cylindrical roller bearing elements 110.

Finally, the contact ring 116 is connected to the shaft 102 such that a portion of the contact ring 116 is arranged in connection with the second contact surface 402 of the first ring shaped contact element 114.

As further depicted in FIG. 5, when the bearing arrangement 104 has been assembled to the shaft 102, the above described circumferential distribution channel 406 is formed.

It is to be understood that the present invention is not limited to the embodiments described above and illustrated in the drawings; rather, the skilled person will recognize that many changes and modifications may be made within the scope of the appended claims.

The invention claimed is:

1. A bearing arrangement (104) connectable to a shaft (102), the bearing arrangement (104) comprising:
   a bearing (105, 105') comprising a plurality of rolling elements (110) arranged to rotate relative to an inner raceway (302) for said bearing arrangement; and
   a ring shaped contact element (114, 114') having an extension in an axial direction thereof, said ring shaped contact element (114, 114') further comprising a first contact surface (402) adapted to face the plurality of rolling elements (110), wherein an inner diameter (410) of the ring shaped contact element (114, 114') at the axial position of the first contact surface (402) has a larger diameter in comparison to a diameter (412) of said inner raceway (302), such that a continuous radial gap (414) is provided in the circumferential direction between the ring shaped contact element (114, 114') and the inner raceway (302) when said bearing arrangement (104) is connected to said shaft (102), wherein said radial gap (414) is arranged to be provided in fluid communication with a lubricating flow channel (306) of the shaft (102) when said bearing arrangement is connected to said shaft.

2. The bearing arrangement (104) according to claim 1, wherein a shaft connecting portion (408) of the ring shaped contact element (114, 114') is connected to the shaft (102) when the bearing arrangement (104) is connected to the shaft (102).

3. The bearing arrangement (104) according to claim 2, wherein the shaft connecting portion (408) of the ring shaped contact element (114, 114') is intended to be press fitted to the shaft (102).

4. The bearing arrangement (104) according to claim 3, wherein an inner diameter of the shaft connecting portion (408) is equal to or smaller than the diameter (412) of the inner raceway (302).

5. The bearing arrangement (104) according to claim 3, wherein an inner diameter of the shaft connecting portion (408) is larger than the diameter (412) of the inner raceway (302).

6. The bearing arrangement (104) according to claim 2, wherein the shaft connecting portion (408) is arranged at an opposite axial end of the ring shaped contact element (114, 114') in comparison to the first contact surface (402).

7. The bearing arrangement (104) according to claim 1, wherein the rolling elements (110) are cylindrical roller bearing elements.

8. A method for assembling the bearing arrangement (104) according to claim 1 to a shaft (102), the method comprising the steps of:
   connecting the bearing (105, 105') to the shaft (102) at a position axially adjacent an opening (312) of a lubricating flow channel (306) of said shaft (102); and
   connecting the ring shaped contact element (114, 114') to the shaft such that a portion of the ring shaped contact element (114, 114') is positioned radially above the opening (312) of the lubricating flow channel (306), and in such a way that a radial gap (414) is provided in the circumferential direction between the ring shaped contact element (114, 114') and the inner raceway (302).

9. A transmission arrangement (200) for a vehicle (1), the transmission arrangement (200) comprising a shaft (102) comprising a lubricating flow channel (306) arranged in at least a radial direction within the shaft; and the bearing arrangement (104) according to claim 1.

10. A vehicle (1) comprising a transmission arrangement (200), said transmission arrangement (200) comprising a shaft (102) comprising a lubricating flow channel (306) arranged in at least a radial direction within the shaft; and the bearing arrangement (104) according to claim 1.

11. An assembly (100) comprising:
   a shaft (102) comprising a lubricating flow channel (306) arranged in at least a radial direction within the shaft (102); and
   a bearing arrangement (104) connected to the shaft (102), said bearing arrangement (104) comprising a bearing (105, 105') comprising a plurality of rolling elements (110) arranged to rotate relative to an inner raceway (302) for said bearing arrangement (104); and a ring shaped contact element (114, 114') having an extension in an axial direction thereof, said ring shaped contact element (114, 114') further comprising a first contact surface (402) facing the plurality of rolling elements (110), wherein an inner diameter (410) of the ring shaped contact element (114, 114') at the axial position of the first contact surface (402) has a larger diameter in comparison to a diameter (412) of said inner raceway (302), such that a continuous radial gap (414) is provided in the circumferential direction between the ring shaped contact element (114, 114') and the inner raceway (302), wherein said radial gap (414) is arranged in fluid communication with said lubricating flow channel (306) of the shaft (102).

12. The assembly (100) according to claim 11, wherein the ring shaped contact element (114, 114'), the shaft (102) and the bearing (105, 105') enclose an opening (312) of said lubricating flow channel (306).

13. The assembly (100) according to claim 11, wherein the ring shaped contact element (114, 114') comprises a second contact surface (404) arranged on an axially opposite side of the ring shaped contact element (114, 114') in comparison to the first contact surface (402), wherein the second contact surface (404) is abutting a radially protruding portion of the shaft (403).

14. The assembly (100) according to claim 11, wherein the inner raceway (302) is formed by a portion of a circumferential surface of said shaft (102).

15. A ring shaped contact element (114, 114') connectable to a shaft (102) provided with a bearing (105, 105') comprising a plurality of rolling elements (110) arranged to rotate relative to said shaft (102) around an inner raceway (302), said ring shaped contact element (114, 114') has an extension in an axial direction thereof and comprises a shaft connecting portion (408) arranged to be connected to the shaft (102), and a first contact surface (402) adapted to face the plurality of rolling elements (110), wherein an inner diameter (410) of the ring shaped contact element (114, 114') at the axial position of the first contact surface (402) has a diameter which is arranged to be larger in comparison to a diameter (412) of said inner raceway (302) for providing a continuous radial gap (414) in the circumferential direction between the ring shaped contact element (114, 114') and the inner raceway (302) when the ring shaped contact element (114, 114') is connected to the shaft (102), wherein the ring shaped contact element (114, 114') is arranged to be connected to the shaft in such a way that said radial gap (414) is provided in fluid communication with a lubricating flow channel (306) of the shaft (102).

* * * * *